United States Patent
Johnson (10) Patent No.: US 10,902,217 B1
(45) Date of Patent: Jan. 26, 2021

(54) METHODS AND SYSTEMS FOR SCALABLE MACHINE TRANSLATION

(71) Applicant: Dessert Labs PBC, San Mateo, CA (US)

(72) Inventor: Michael Dudley Johnson, San Mateo, CA (US)

(73) Assignee: Michael Dudley Johnson, Menlo Park, CA (US)

( * ) Notice: Subject to any disclaimer, the term of this patent is extended or adjusted under 35 U.S.C. 154(b) by 170 days.

(21) Appl. No.: 16/117,745

(22) Filed: Aug. 30, 2018

Related U.S. Application Data (60) Provisional application No. 62/698,857, filed on Jul. 16, 2018.

(51) Int. Cl.
| | | |
|---|---|---|
| *G06F 40/00* | (2020.01) | |
| *G06F 40/51* | (2020.01) | |
| *G06F 40/47* | (2020.01) | |
| *G06F 40/55* | (2020.01) | |
| *G06F 40/44* | (2020.01) | |
| *G06F 40/45* | (2020.01) | |

(52) U.S. Cl.
CPC .............. *G06F 40/51* (2020.01); *G06F 40/47* (2020.01); *G06F 40/55* (2020.01); *G06F 40/44* (2020.01); *G06F 40/45* (2020.01)

(58) Field of Classification Search
CPC combination set(s) only.
See application file for complete search history.

(56) References Cited

U.S. PATENT DOCUMENTS

| | | | |
|---|---|---|---|
| 6,278,967 B1 | 8/2001 | Akers et al. | |
| 7,050,964 B2 * | 5/2006 | Menzes | G06F 40/45 704/2 |
| 9,298,697 B2 * | 3/2016 | Allen | G06F 40/253 |
| 9,710,429 B1 | 7/2017 | Raghunath | |
| 2020/0012740 A1 * | 1/2020 | Bish | G06F 11/3476 |

OTHER PUBLICATIONS

Klubicka et al. Collaborative development of a rule-based machine translator between Croatian and Serbian. Baltic J. Modern Computing. vol. 4 (2016, No. 2, pp. 361-367.

* cited by examiner

*Primary Examiner* — Vu B Hang
(74) *Attorney, Agent, or Firm* — Wilson Sonsini Goodrich & Rosati (57) ABSTRACT

The present disclosure provides methods and systems for generating a rule for machine translation. The method comprises receiving a user input indicating a change of a rule; retrieving a prior version of the rule from a storage unit upon receiving the user input; identifying one or more metrics from a plurality of metrics based at least in part on the prior version of the rule; computing, with aid of one or more processors, a value for each of the one or more metrics by evaluating each metric against a set of examples, wherein the value represents the impact of the change of the rule; and comparing the value to a pre-determined threshold to determine whether the change of the rule is acceptable.

7 Claims, 8 Drawing Sheets

```
@ auto
processed on 11.4.77 seconds

Corpus: lexy            general_en_zh

Rules
Rules changed:
- EN: model
- Preposition[lexeme='at'] ->
  ^Verb[+final, lexeme='有']
+ (ProductOverall (ComplexNounPhrase
  (NounPhrase ...) Conjunction
  NounPhrase))
  Place[str='throughout'] ->
  (ProductOverall (ComplexNounPhrase
  (NounPhrase Noun[lexeme='全件']))
  0.0.0] 0.1 0.2)
Change from baseline (Expand all)
-18 correct
-4
lexy_GeneralBulletsExamples_sizing
-1
lexy_GeneralBulletsExamples_bullets
-13
lexy_GeneralDimensionsExamples_sizing
```

```
-1 translated
-1
lexy_GeneralBulletsExamples_bullets

-6 parsed
-1 EN
lexy_CustomerSupportExamples
-2 EN
lexy_GeneralBulletsExamples_bullets
-3 EN
lexy_GeneralDimensionsExamples_sizing -1 lexed
-1 EN
lexy_GeneralBulletsExamples_bullets Stats
Total entries: 2316
Processed entries: 2316
Lexed: 2274/2316 (98.2%)
Parsed: 1051/2316 (45.4%)
Average parses: 2.2
Parse timeouts: 0
```

METHODS AND SYSTEMS FOR SCALABLE MACHINE TRANSLATION

CROSS-REFERENCE

This application claims the benefit of U.S. Provisional Application No. 62/698,857, filed Jul. 16, 2018, which application is incorporated herein by reference.

BACKGROUND

Machine translation (MT) systems utilize various approaches and methods to recognize various complex language constructs and produce quality translation of texts from one language into another. For example, one type of machine translation is based on automated analysis and construction of models from large amounts of data. Such approaches or methods relate to using automated analysis of "examples", and constructing statistical-, rule- or neural-based machine translation models. In these cases the model produced is incomprehensible to humans, and only aggregate patterns or outputs can be discerned. Such machine translation systems may face issues such as relatively low quality or inaccurate translation. Another type of machine translation includes a large amount of rules that are defined by human beings, and a given rule is typically understood and comprehensible to another person that did not write the original rule. These rules are rewritten into computer programs to implement machine translation. Rule-based machine translation has high translation quality but may be difficult to scale to a desirable size. For example, such machine translation systems rely on hand-coded transfer components that are both difficult and expensive to customize for a particular domain, and are also difficult to scale. In another example, with an increasing size of a collection of rules, it may take longer to evaluate a rule change or determine whether a newly applied set of rule changes improves or degrades the quality of the translation engine.

SUMMARY

The present disclosure provides machine translation systems that can address various drawbacks of conventional systems, including those recognized above. A machine translation system of the present disclosure is advantageously able to improve cost effectiveness and overall utility. The present disclosure provides systems and methods that are capable of improving efficiency of machine translation ruleset construction, which may permit one or more users to add or modify a rule for machine translation with improved speed. The provided systems and methods may increase the speed of rule writing by at least reducing the period of time for evaluating the performance of translation and/or evaluating the impact of a rule change. In particular, users may be allowed to visualize an impact of a rule change in substantially real-time via a graphical user interface provided by the systems.

Systems and methods of the present disclosure may also permit multiple users to create or write rules concurrently thereby improving the coverage and scale of the machine translation system. Allowing multiple users to add or modify rules simultaneously and smoothly may provide improved scalability, flexibility, and quality of machine translation. Systems and methods of the present disclosure may enable multiple users to create rules in an efficient way by resolving conflicting rules changes in substantially real-time.

In one aspect, the present disclosure provides methods and systems for generating a rule for machine translation. The method comprises: method for building a ruleset for machine translation; retrieving a prior version of the rule from a storage unit upon receiving the user input; identifying one or more metrics from a plurality of metrics based at least in part on the prior version of the rule and the one or more edits; computing, with aid of one or more processors, a value for each of the one or more metrics by evaluating each metric against a set of examples by applying at least the rule with the one or more edits, wherein the value represents an impact level of the one or more edits of the rule and comparing the value to a pre-determined threshold to determine whether the one or more edits are acceptable.

In some embodiments, the one or more metrics are identified by determining one or more metrics affected by the one or more edits of the rule. In some embodiments, at least one metric from the plurality of metrics is identified to be not affected by the change of the rule. In some cases, a value of the at least one metric obtained from a prior calculation is retrieved from the storage unit. In some embodiments, the value for each of the one or more metrics is evaluated against different sets of examples by multiple computing devices. In some cases, an aggregation of the values computed by the multiple computing devices is used for representing the impact level of the one or more edits of the rule.

In some embodiments, the method further comprises displaying the one or more metrics and the associated values on a graphical user interface. In some embodiments, the value for at least one of the one or more metrics is computed by applying the rule with one or more edits along with one or more other rules required for evaluating the at least one metric.

In a related yet separate aspect, a system for building a ruleset for machine translation is provided. The system comprises: a server in communication with a plurality of user devices over a network, wherein the server comprises: (i) a memory for storing a set of software instructions, historical versions of a rule or a ruleset, a plurality of examples, a plurality of metrics and a corresponding value, and (ii) one or more processors configured to execute the set of software instructions to: retrieve a prior version of a rule from the memory upon receiving a user input indicating one or more edits of the rule; identify one or more metrics from a plurality of metrics based at least in part on the prior version of the rule and the one or more edits; compute, with aid of one or more processors, a value for each of the one or more metrics by evaluating each metric against a set of examples by applying at least the rule with the one or more edits, wherein the value represents an impact level of the one or more edits of the rule; and compare the value to a pre-determined threshold to determine whether the one or more edits are acceptable.

In some embodiments, the one or more processors are configured to display the one or more metrics and the associated values on a graphical user interface (GUI) of at least one of the plurality of user devices. In some embodiments, the value for each of the one or more metrics is evaluated against different sets of examples by the plurality of user devices. In some cases, an aggregation of the values computed by the plurality of user devices is used for representing the impact level of the one or more edits of the rule.

In another aspect, a method for iteratively building a ruleset for machine translation is provided. The method comprises: (a) receiving user input indicating one or more edits of a rule; (b) retrieving a prior version of the rule from a storage unit upon receiving the user input; (c) identifying one or more metrics from a plurality of metrics based at least in part on the prior version of the rule and the one or more edits; (d) computing, with aid of one or more processors, a value for each of the one or more metrics by evaluating each metric against a set of examples by applying the rule with the one or more edits and one or more other rules from the ruleset, wherein the value represents the impact level of the one or more edits of the rule; (e) comparing the value to a pre-determined threshold to determine whether the one or more edits are acceptable; and (f) detecting one or more conflicting edits made to the ruleset that are conflicting with the one or more edits when the one or more edits are determined to be acceptable, and updating the ruleset with a winning edits, wherein the winning edits are determined based on a conflict resolution policy.

In some embodiments, the method further comprises displaying the one or more metrics and the associated values on a graphical user interface (GUI). In some embodiments, the method further comprises repeating (a)-(d) when the one or more edits are determined to be not acceptable in (d).

It shall be understood that different aspects of the invention can be appreciated individually, collectively, or in combination with each other. Various aspects of the invention described herein may be applied to any of the particular applications set forth below or for any other types of the machine translation methods and systems disclosed herein. Any description herein concerning the rule analysis or machine translation programs may apply to and be used for any other machine translation situations. Additionally, any embodiments disclosed in the context of the machine translation system are also applicable to the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "machine translation", as used herein, generally refers to a process or method for utilizing computer programs for automatic language translation. Machine translation systems are systems of one or more computers running machine translation software using language data to translate text from a source language into text into a target language. For example, machine translation systems may receive a textual input in one language, translate it to a second language, and provide a textual output in the second language. In another example, machine translation systems may receive a textual input in one language, translate it to a second language, then translate it to a third language for textual output. In another example, the overall system may have received input in audio form in one language, utilized an automatic speech recognition system to provide textual output in that language optionally with some form of annotated confidence and metadata, which is then processed by the machine translation engine to produce textual output in a second language, which is optionally then processed by a speech synthesis engine to provide audio output in the second language.

A machine translation process, depending on the specific approach adopted, may include several stages or steps. In general, rule-based methods may comprise parsing a text, usually creating an intermediary, symbolic representation, from which the text in the target language is generated. In an exemplary process of transfer-based translation, first, the source language text is parsed to determine its syntactic and semantic structure. Second, the parse tree is rearranged based on a set of transfer rules related to the set of syntactic, semantic and lexical aspects of the original parse tree. Third, the resulting tree is modified to match the natural order of the destination language, including any language features only contained in the destination language. Fourth, the individual source language words or characters are translated into destination language words or characters. The resultant word sequence is a destination language translation of the source language sentence. These methods may require extensive lexicons with morphological, syntactic, and semantic information, and large sets of rules.

Various rules may be applied in at least some the aforementioned stages or steps. For example, in the lexical analysis stage, linguistics rules, grammatical rules and/or lexical rules may be utilized. Lexical rules generally refer to a word or words and define both semantic and syntactic properties. In another example, one or more translation rules may be applied during the transfer stage. It should be noted that various rules may be adopted depending on the specific techniques utilized for machine translation. Although rule-based machine translation is discussed as an example, the provided method for evaluating impact of a rule or change of a rule can be applied to any other rules utilized in a machine translation system and should not be limited as such. For example, the rules may comprise rules for pre-processing or post-processing data in statistic machine translation, rules generated based on examples, or one or more models generated in deep learning based machine translation.

The rules can relate to various aspects of language, translation of language or analysis of langue. For instance, the rules may relate to contextual word sense or translations, grammatical domain, dialect, translation requester (e.g., user) and the like. Examples of rule types may include: a word or series of words as an individual lexical entry, various morphologies for a lexical entry, spellings for a morphological variant of a lexical entry, context for a given word or series of words to be treated as a given lexical entry; for example "table" being a Verb in the context of parliamentary discussions, comparative or absolute rankings of rules, simple definitions of grammatical structures, more complex definitions of grammatical structures that utilize regular-expression-like repetition operators, dependencies between words or multiples series of words, grammatical structures that are valid only in certain cases of agreement, translations of an entire sequence of characters or words, translations of a given word or series of words, extraction of human-understandable content from HTML based on CSS and other textual and contextual properties of a webpage, transformations of an entire parse tree or subtree into another parse tree or subtree, transformations of a partial parse tree into another partial parse tree with subtrees moved or transduced according to the rule, translation-specific operators such as ceasing to process, processing only in a given context, processing at most once, and so on.

The rules may be generated or constructed by one or more users. For example, the rules may be hand-coded by a user or provided by a user via a user interface. In some cases, the rules can be implemented directly for machine translation. In some cases, the rules may be entered by a user via a graphical user interface where the user needs not be an expert in writing the rules into computer programs. Such rules may be rewritten or converted into computer programs by the system to implement machine translation. In some cases, the rules may be automatically generated from an external source of information, such as a list of all cities in the world, or an existing dictionary for translating from one language to another. In some cases, the author of the rules is known—including the case when the author of the rules is a computer program.

As the number of good rules increase, the translation performance is improved. It is important to determine whether a rule change, which may be made up of one or more edits to one or more rules, is a good change or should be applied to an existing set of rules. A rule change may be accepted and applied to a current ruleset when the performance of translation is improved. Different rules in different stages may impact the performance differently. For instance, in rule-based translation, a rule-based parser that stores knowledge about the structure of language in the form of linguistic rules may be utilized. The parser makes use of syntactic and morphological information about individual words found in the dictionary or "lexicon" or derived through morphological processing (organized in the lexical analysis stage). Successful parsing requires that the parser (grammar) have the necessary rules and the lexical analyzer provide all the details needed by the parser to resolve as many ambiguities as it can at that level. In addition, the system may calculate that any segment with greater than a defined number of parses, such as 4, is not sufficiently disambiguated to provide a correct parse, and mark it as not parsing.

The present disclosure provides a method for determining whether a rule change should be applied by determining an impact of a rule change. In particular, the impact of a rule change can be evaluated in a quantitative manner. The provided methods may be capable of measuring the impact of a change of a rule which may be applied in any stage of a machine translation process.

Quantitative Analysis of Impact of a Rule Change

In the aforementioned machine translation process, a rule change may impact the performance or quality of translation. A rule change may include one or more of, for example, modification of a rule, adding a new rule, removing a rule, change of definition of a rule, change of the context that must match in order for a rule to apply, moving a rule from one ruleset to another, creating a shorthand definition to be substituted into other rules, change of order of rules and various others that may introduce changes to a rule, multiple rules or a set of rules. A change may refer to the change of a rule relative to a prior version of the rule. A change may refer to the change of a rule relative to a baseline of the rule.

The impact of a rule change may be determined based on one or more metrics. The one or more metrics may relate to various aspects of performance/quality of translation. The one or more metrics may relate to different sessions, steps or stages of a translation process. The one or more metrics may be determined to measure the impact of a rule change on any stage, step, or session of a translation process. The one or more metrics may include, but not limited to, the number of examples that can be lexed, parsed, translated, translated correctly with different spacing, translated identically with different case sensitivity, parsed or translated using a specific set of rules or rulesets, translated identically, and the like. A ruleset or a set of rules may be a set of rules that are processed to perform an analysis such as natural language processing, parsing analysis or syntactic analysis.

The examples may be used for testing or computing a value for each of the one or more metrics. The examples may comprise a collection of samples of written language from a wide range of sources such as corpus database.

The one or more metrics for different set of rules or ruleset may or may not be the same. In some cases, the metrics may be selected based on the specific translation techniques utilized or a given rule/set of rules. The one or more metrics can be defined in any other suitable formats. For instance, instead of or in addition to the number of examples correctly lexed, parsed, translated and the like, the percentage of examples correctly lexed, parsed, translated may be used as the metric. In addition to absolute numbers, metrics can be grouped into higher level categories. For example, a rule change may cause 100 more examples to translate, of which 90 of the examples came from a single grouping of examples, and the rule change causes all examples in that group to translate. There can be multiple layers of grouping, for example sentences in a paragraph, paragraphs on a page, pages in a book, and books in a series of books, and the completeness or metrics on each of these groupings can be reported. The metrics can take into account various weightings of the examples, for example regarding a smaller set of examples as essential to maintain metrics on, or regarding the examples from one corpus to be more important than another corpus. The metrics can include the number of examples where processing failed to complete due to time or memory limitations of the processing system. The one or more metrics can include any other measurements that may not rely on the number of examples or example corpora correctly processed. The one or more metrics may, in some cases, represent a result of an analysis or a process. For example, the metric can be based on the output of a parsing engine (i.e., examples are parsed or not), a translation result (i.e., examples are translated or not) or a lexical analysis results (i.e., examples are lexed or not).

The impact of a rule change may be obtained by calculating the value for each metric. In some cases, the impact of a rule change may be represented by the value of each metric. As aforementioned, the value for each metric may be computed by evaluating the metric against a set of examples. In some instances when the metric is based on an analysis result such as translation, lexical analysis or parsing result, other rules required for performing the analysis may be applied. For example, a value of a metric (e.g, number of parsed examples) may be computed by applying the rule with the rule change along with one or more other rules from the ruleset or set of rules associated with parsing to a set of examples.

In some cases, the impact of a rule change may be represented by an overall score based on the one or more metrics. In an example, a qualitative measurement of a rule change may be achieved by combining the values for the metrics. For instance, a score associated with a rule change or indicating the impact level of a rule change may be computed. The score may be correlated with the metrics in various ways, such as linearly correlated or non-linearly corrected. Any suitable formula or equation may be employed to calculate the score. For example, the score can be calculated or determined as a weighted sum of the various metrics. The weight coefficients may be indicative of significance of the associated metric. The weight coefficients may be determined empirically such as based on historic data. The weight coefficients may be determined based on any suitable theory or any purposes. The weight coefficients may or may not be equivalent. In another example, the impact of a rule change may be measured by examining the value for each of the metrics individually.

The measurement of an impact of a rule change may be used to determine whether a rule change should be applied to the system. In some cases, the computed value of a rule change or the value of each metric may be compared against a pre-determined threshold respectively to determine whether a rule change can be applied. For example, the number of examples can be lexed, parsed, translated, and translated correctly with different spacing may be compared with a pre-determined threshold individually, the corresponding rule change may be considered to be acceptable or applied to the current set of rules when each metric exceeds the respective threshold or when certain metrics exceed the respective thresholds. Alternatively or additionally, the overall score of the impact may be compared with a threshold to determine whether the rule change should be accepted.

The calculation of a rule change or impact of a rule change can be performed in a timely fashion. In some embodiments, the efficiency of the calculation may be improved by calculating a rule change as a delta from a prior version of the rule or ruleset such that at least a portion of the information obtained from prior calculations can be re-used. For example, by identifying which of the one or more metrics are not affected by a rule change, such metrics may not be re-calculated. Similarly, not all of the examples need to be calculated for every single rule change. For instance, examples that are not affected by a given rule change may be identified and may not be used for evaluating the one or more metrics. This is advantageous to provide an efficient evaluation of rule change by reducing the number of examples or metrics to be re-calculated thus decreasing consumption of computing power of servers.

In some cases, different versions of a rule may be tracked. In some cases, different version of a ruleset may be tracked. Tracking different versions of a rule change may be helpful for identifying which metrics or examples need to be re-calculated. For example, the translated tree for "I have 2 <somethings>" does not need to be re-calculated, where the sub-portion that relates to dogs needs to be re-calculated. In some cases, the different versions of rules may be archived with respect to the stages of translation process. In some cases, an indexing mechanism may be used for tracking the versions of a rule. For example, every time a rule is created or updated, a previous version of the rule (if any) may be archived in the registry, and a more recent version of the rule may be generated. The versioning may comprise assigning a new unique identifier to the updated rule and/or the stage of the process. In addition, the versioning may comprise saving the time point (e.g., date and time of the most recent update). In some embodiments, creation of a version associated with a rule may be triggered by an operation such as publishing/committing a rule change, submitting a new rule edit and the like.

The one or more metrics computed for each version may also be tracked. In some cases, the value of metrics associated with each version of a rule may be tracked. This is advantageous to provide an efficient evaluation of rule change by reducing the number of metrics to be re-calculated thus decreasing consumption of computing power of servers. In some cases, by tracking the versions of a rule along with the stages in the translation process, one or more metrics may be identified as not being affected by a given rule change and such one or more metrics may not need to be re-calculated. For example, if the rule change is that dog now is translated as 犬 instead of 狗, the English parse for "I have 2 dogs" may not need to be re-calculated. In another example, for a given rule change, which stages of the transfer process need to be re-calculated for a given example/set of examples may be identified, then one or more metrics associated with the stage may be identified and re-calculated against the given example/set of examples.

In some embodiments, the impact of a rule change may be computed utilizing multiple computing devices. The impact calculated by the multiple computing devices may be aggregated to obtain an impact of a rule change. This is advantageous for improving the computation efficiency by distributing the evaluation computation among multiple computing devices. The evaluation of a rule change can be distributed to the multiple devices in various ways. For example, different computing devices may be assigned different sets of examples to be evaluated against. In another example, different computing devices may be assigned different metrics for calculation. In some cases, the different computing devices share the same set of rules. Alternatively, the current set of rules used by each computing device may not be the same.

Impact results calculated by each computing device may be aggregated to obtain an overall impact of a rule change. Many different approaches can be adopted to aggregate the results. For example, a sum of the numbers of examples that are corrected translated by different computing devices may be used as the value for the corresponding metric (i.e., number of examples correctly translated). In another example, a positive impact may be presented by a positive number and a negative impact may be represented by a negative number. For instance, if one computing device calculates that a rule change added +2 parses for the examples it processed, and a different computing device calculates −10 parses for the examples it processed, the aggregated result for the number of parses is the sum which is −8 parses. This may indicate the corresponding rule change may have a negative impact on the system.

In accordance with the present disclosure, users may refer to people who contribute in rule construction or other users of the platform. The users may be, for example, familiar with both source language and target langue, a target language rather than the source language or vice versa, experts in grammar guidelines, or ordinary people who are not familiar with linguistic rules or translation rules. Any features of the methods and systems described herein as relating to a user may also relate to an entity such as research center, company or organization. Thus, a user can be understood in a broader sense to include both users who interact with (e.g., provide input) the system to cause a rule change, and entities who may access at least part of the system without contributing to the rule construction (e.g., people who use the machine translation engine).

Methods and Systems for Machine Translation

Figure 1:
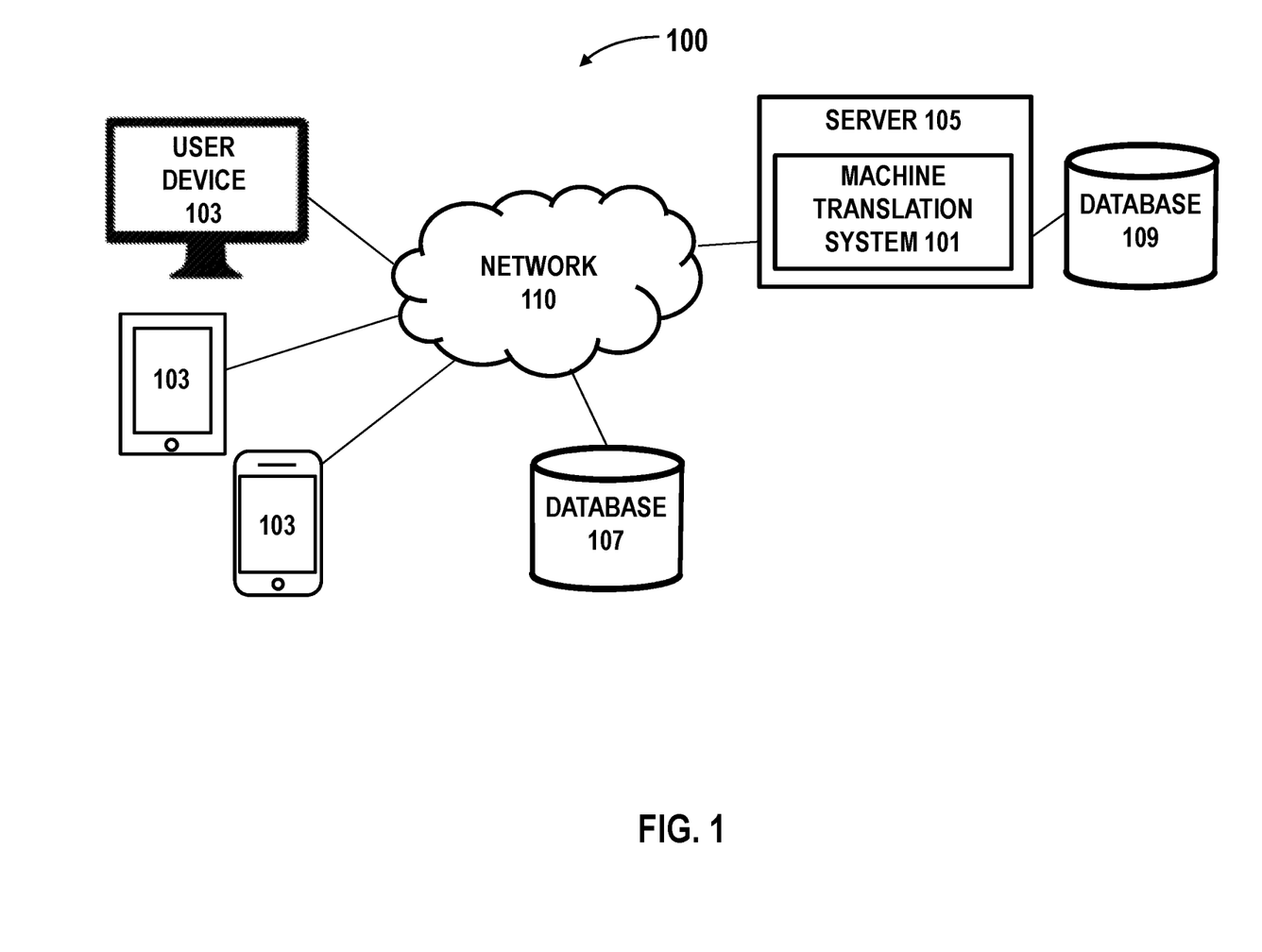
FIG. 1 shows an environment in which a machine translation system may operate, in accordance with various embodiments of the invention.

FIG. 1 shows an environment 100 in which a machine translation system 101 may operate. The machine translation system 101 may interact with one or more user devices 103, through one or more networks 110. The machine translation system 101 may also be referred to as machine translation platform throughout the disclosure.

In some embodiments, the machine translation system 101 may be configured to translate source language text into machine-translated target language text. The machine translation system may comprise a rule analysis engine allowing users to provide inputs indicating rule changes, and a machine translation engine utilizing rules constructed with aid of the rule analysis engine. The machine translation engine and the rule analysis engine may be self-contained components that can be independently operated and worked on by different users concurrently. The architecture of the machine translation system, rule analysis engine and its various objects are described later herein.

The machine translation system 101 may comprise servers 105 and database systems 107, 109, which may be configured for storing or retrieving relevant data. Relevant data may comprise the examples used for calculating metrics, metrics, rules, impact of a rule change, examples used for evaluating an impact, and various other data as described elsewhere herein. The relevant data may also comprise information such as user data that may not relate to translation rules directly. Each of the components (e.g., servers, database systems, user devices, and the like) may be operatively connected to one another via network 110 or any type of communication links that allows transmission of data from one component to another. For instance, the servers and database systems may be in communication—via the network 110—with the user devices 103 and/or data sources to obtain relevant data, for example.

A server may include a web server, an enterprise server, or any other type of computer server, and can be computer programmed to accept requests (e.g., HTTP, or other protocols that can initiate data transmission) from a computing device (e.g., user device, other servers) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The one or more databases may utilize any suitable database techniques. For instance, structured query language (SQL) or "NoSQL" database may be utilized for storing rules library, metrics, metrics associated with a stage, rule or a set of rules associated with a metric, session of a translation process, values of the metrics, examples and other data. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the machine translation system may construct the database in order to deliver the data to the users or machine translation engine efficiently. For example, the machine translation system may provide customized algorithms to extract, transform, and load (ETL) the data. In some embodiments, the machine translation system may construct the databases using proprietary database architecture or data structures to provide an efficient database model that is adapted to large scale databases, is easily scalable, is efficient in query and data retrieval, or has reduced memory requirements in comparison to using other data structures.

The machine translation system 101 may be implemented anywhere in the network. The machine translation system 101 may be implemented on one or more servers in the network, in one or more databases in the network, or one or more user devices. The machine translation system 101 may be implemented using software, hardware, or a combination of software and hardware in one or more of the above-mentioned components within the system 100.

User device 103 may be a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device configured to enable the user to enter user defined rule, a change of a rule, and display other information as it relates to translation, a performance of a translation, impact of a rule change, for example. The user device may be a handheld object. The user device may be portable. The user device may be carried by a human user. In some cases, the user device may be located remotely from a human user, and the user can control the user device using wireless and/or wired communications.

The user device may include a communication unit, which may permit the communications with one or more other components in the network. In some instances, the communication unit may include a single communication module, or multiple communication modules. In some instances, the user device may be capable of interacting with one or more components in the network environment using a single communication link or multiple different types of communication links. The user devices 103 may interact with the machine translation system by requesting and obtaining the aforementioned data via the network 110.

User device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the user devices 103 to interact with the machine translation system 101 by way of one or more software applications (i.e., client software) running on and/or accessed by the user devices, wherein the user devices 103 and the machine translation system may form a client-server relationship. For example, the user devices 103 may run dedicated mobile applications associated with the machine translation system and/or utilize one or more browser applications to access machine translation engine on the machine translation system. In turn, the machine translation system may deliver information and content to the user devices 103 related to translation result, rule change result, impact of a rule change, for example, by way of one or more web pages or pages/views of a mobile application.

In some embodiments, the client software (i.e., software applications installed on the user devices 103) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

User device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show graphical elements that permit a user to view the impact of a rule change, selected rules in the system, translation input/output and the like. The user device may also be configured to display webpages and/or websites on the Internet. One or more of the webpages/websites may be hosted by a server in the network or the machine translation platform.

In some cases, the network environment may comprise a cloud infrastructure. One or more virtual systems such as Docker systems may be utilized in the network for allowing the multiple users or user devices to interact with the machine translation system. In such case, each user device can be considered to be a processing environment that is being used by a developer/participant as part of a machine translation development team. The plurality of user devices may comprise heterogeneous thin or thick client platforms (e.g., mobile phones, laptops, and PDAs). For example, the user device may allow one or more users to access applications through either a thin client interface, such as a web browser or program interface. The plurality of client devices may comprise any general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

User devices may be associated with one or more users. In some embodiments, a user may be associated with a unique user device. Alternatively, a user may be associated with a plurality of user devices. A user as described herein may refer to an individual or a group of individuals who are contributing to rule construction or accessing/utilizing the machine translation engine.

The network 110 may be a communication pathway between the machine translation system 101, the user devices 103, and other components of the network. The network may comprise any combination of local area and/or wide area networks using both wireless and/or wired communications systems. For example, the network 110 may include the Internet, as well as mobile telephone networks. In one embodiment, the network 110 uses standard communications technologies and/or protocols. Hence, the network 110 may include links using technologies such as Ethernet, 802.11, worldwide interoperability for microwave access (WiMAX), 2G/3G/4G or Long Term Evolution (LTE) mobile communications protocols, InfraRed (IR) communication technologies, and/or Wi-Fi, and may be wireless, wired, asynchronous transfer mode (ATM), InfiniBand, PCI Express Advanced Switching, or a combination thereof. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

In some embodiments, the machine translation platform may provide a user interface for presenting rule analysis information to the user while allowing for a user to add or edit rules via user interaction. The user interface in some cases is a graphical user interface (GUI).

Figure 2:
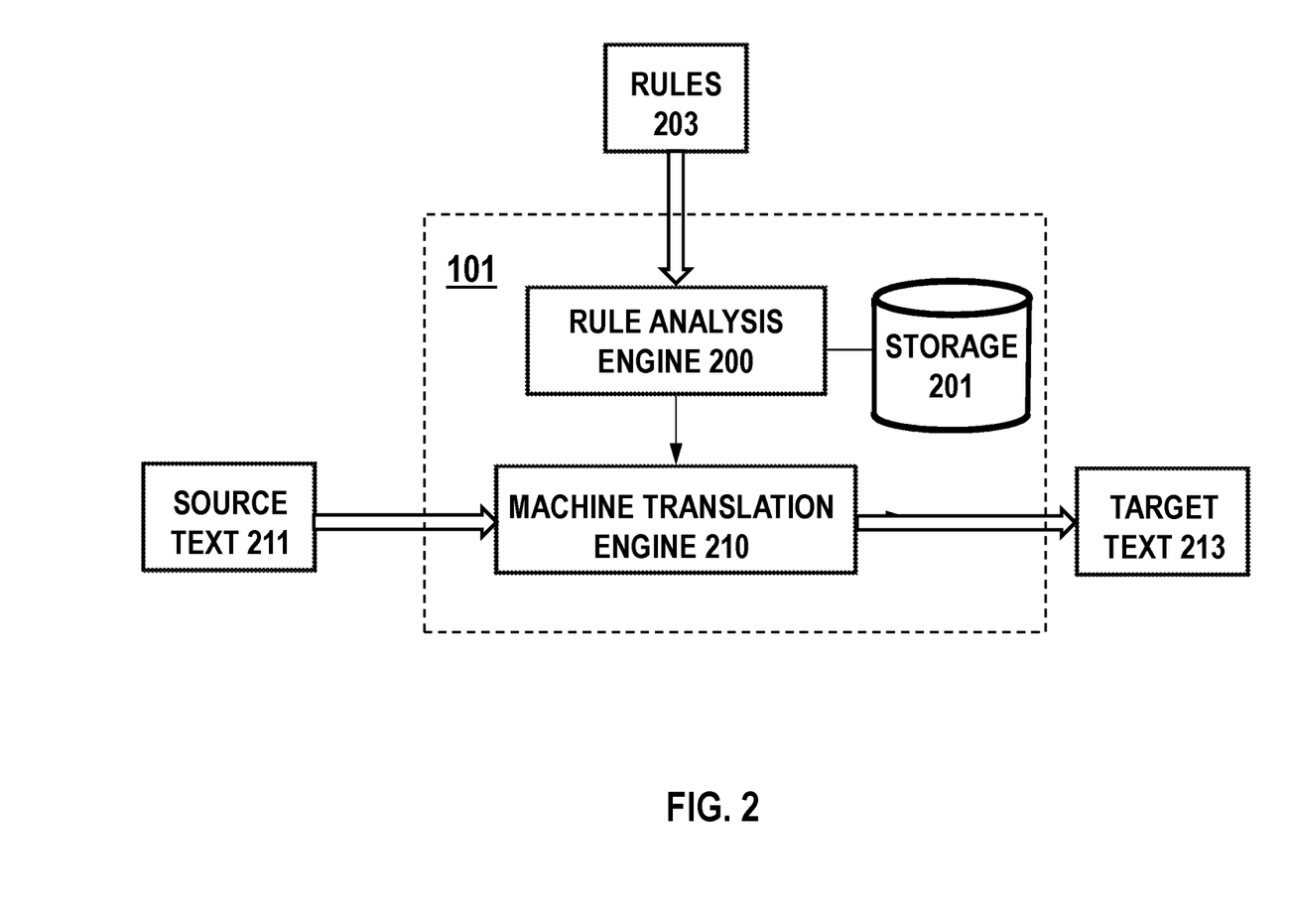
FIG. 2 schematically shows an example of a machine translation system, in accordance with embodiments of the invention.

FIG. 2 schematically shows an example of a machine translation system 101, in accordance with some embodiments of the invention. In some embodiments, the machine translation system 101 may comprise a rule analysis engine 200 operably coupled to a machine translation engine 210. The machine translation system may further comprise one or more storage systems 201. The one or more storage systems may comprise one or more databases that can be same as the database as described in FIG. 1. Although the rule analysis engine and the machine translation engine are shown as separate components, the rule analysis engine and the machine translation engine can be integrated as a single component. Similarly, the storage system 201 can also be part of the machine translation engine 210 or part of the rule analysis engine 200. The rule analysis engine can be a standalone system or can be coupled to any other machine translation engine, systems or subsystems. The machine translation engine and the rule analysis engine may be self-contained components that can be independently operated and worked on by different users concurrently.

The machine translation engine 210 may be configured to translate source text 211 in one language into a target text 213 in another language. The machine translation engine 210 can utilize any suitable translation techniques such as rule-based translation, example-based translation, or statistical translation as described elsewhere herein. In some embodiments, the machine translation engine 210 may perform translation utilizing one or more rules generated by the rule analysis engine 200. In some cases, the rules are evaluated and constructed by the rule analysis engine 200 in advance. Additionally or alternatively, rules utilized by the machine translation engine 210 may be changed and evaluated via the rule analysis engine concurrently. In some cases, the machine translation engine 210 may allow a user to write rules while the change of rules are analyzed and evaluated by the rule analysis engine. In some cases, the machine translation engine 210 may be configured to perform a portion of the rule analysis such as calculating one or more metrics.

The rule analysis engine 200 may be configured to receive an input comprising a rule change 203. The input may comprise definition of a rule, one or more rules, a change of rule and various others. The rule analysis engine 200 may be configured to determine whether the rule change is acceptable or should be applied to the current set of rules. In some embodiments, the rule analysis engine 200 may implement the quantitative analysis of an impact of a rule change to decide whether the rule change is valid or good. Upon determining the rule change is acceptable, the rule change may be applied to the current set of rules that can be used by the machine translation engine.

The method for calculating the impact of a rule change can be the same as described above. For example, one or more metrics may be identified for a given rule change, then the value for each metric may be calculated. In some cases, an aggregated value (e.g., score) of the one or more metrics may be compared against a pre-determined threshold to determine whether the rule change is acceptable. In some cases, each value of the metric may be compared against a pre-determined threshold respectively to determine whether the rule change is acceptable.

The rule analysis engine 200 may be configured to output an impact of a rule change, a result indicating acceptance of a rule change or rejection of a rule change, or the accepted rule change. In some cases, rules determined to be acceptable by the rule analysis engine may be provided to the machine translation engine for future implementation. In some cases, the result of the analysis may be provided to a user on a user interface for rule construction.

The rule analysis engine 200 may be coupled to or comprise a storage system 201. The storage system 201 may be configured to track different versions of a rule, rules in different stages of a translation process, rule(s)/ruleset associated with a metric (i.e., required for evaluating a metric), store one or more metrics associated with a rule, one or more metrics associated with a stage in a translation process, or the value for each metric and various others.

Visualization of Impact of Rule Change

The provided methods and systems may allow a user to visualize the impact of a rule change on a user interface. This is beneficial to provide a real time feedback to the user for further refine or adjust a rule change. A user may visualize a quantitative measurement to a rule change.

Figure 3:
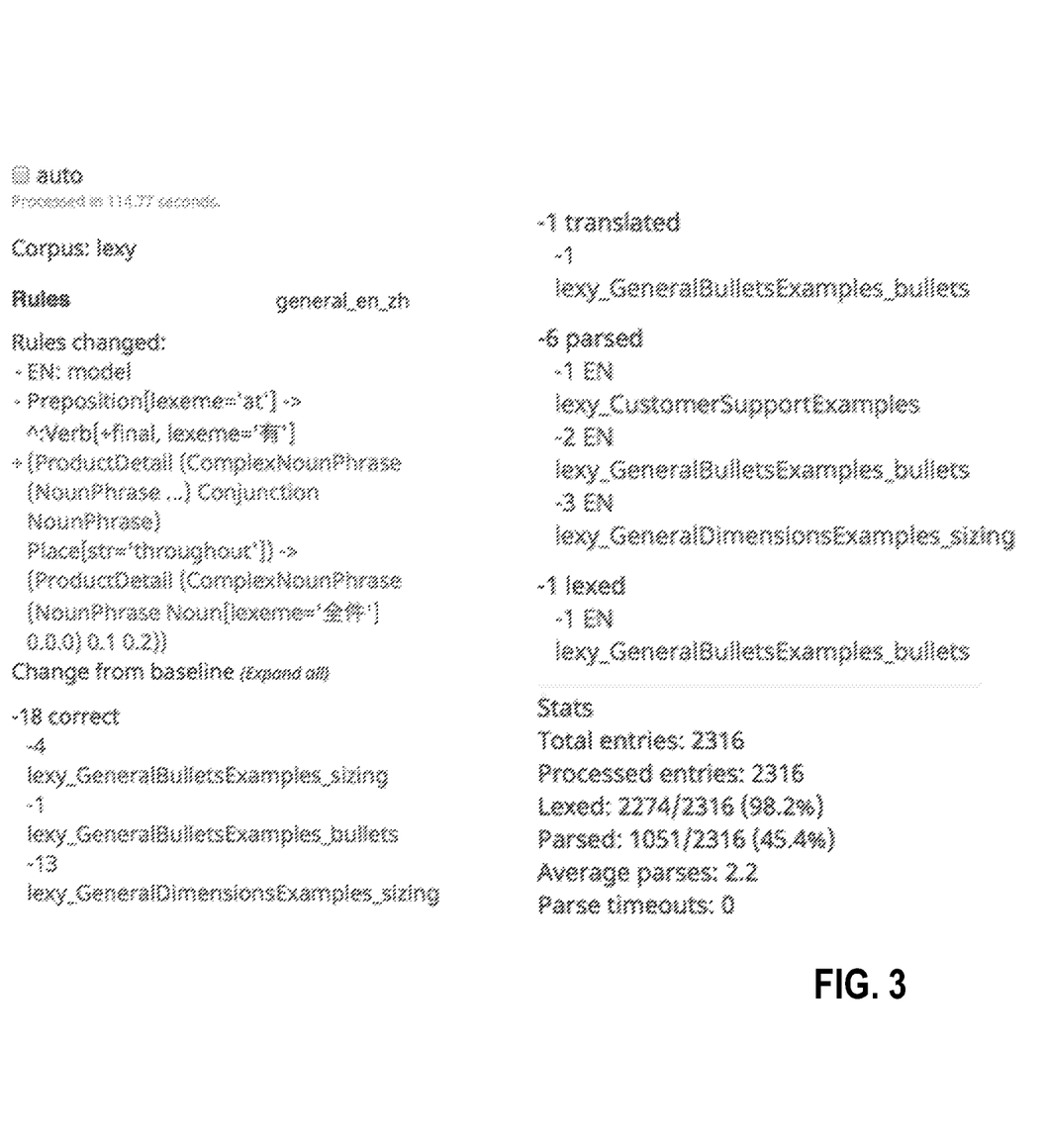
FIG. 3 shows an example of a user interface, in accordance with embodiments of the invention.

FIG. 3 shows an example of a user interface. In the illustrated example, user-inputted rule change may be displayed. The calculation for each of a plurality of metrics (e.g., number of examples translated, parsed, etc) is displayed to the user. The value for each metric is a result generated by aggregating the corresponding metric values obtained from different computing devices. For example, the number of examples parsed is a sum of +69 parses and −182 parses which is −113 parses. Any number of computing devices can be utilized for generating an overall impact result. The plurality of computing devices may or may not be user devices. In some cases, additional information may be displayed in a user. For instance, information indicating the rule is accepted or declined may be provided to the user.

Figure 4:
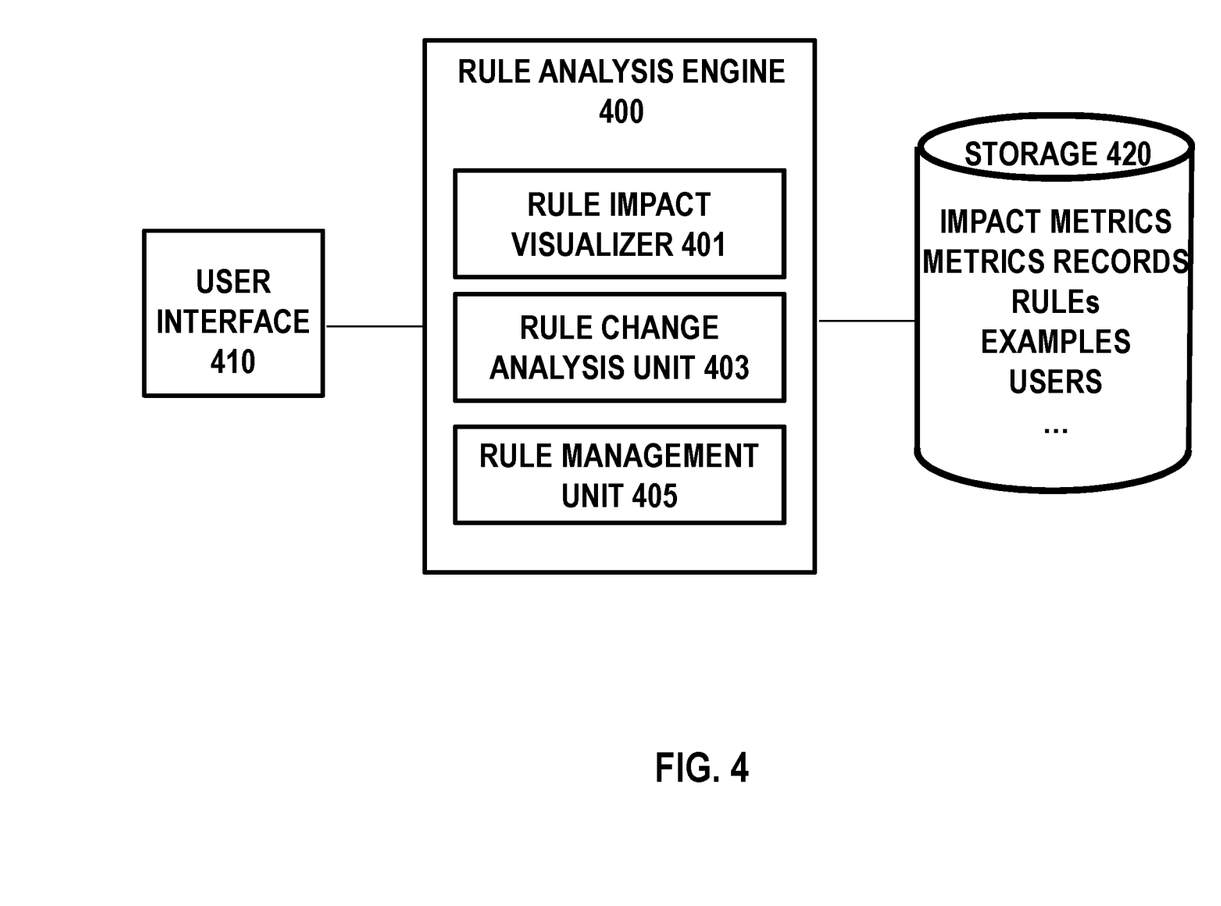
FIG. 4 shows an example of a rule analysis engine, in accordance with embodiments of the invention.

FIG. 4 shows an example of a rule analysis engine 400, in accordance with some embodiments of the present invention. In some embodiments, the rule analysis engine may comprise a rule impact visualizer 401, a rule change analysis unit 403 and a rule management unit 405.

The rule change analysis unit 403 may be configured to calculate the impact of a rule change employing the methods as described above. For example, the rule change analysis unit 403 may be configured to compute a value for a metric upon receiving a rule change. In another example, the rule change analysis unit may aggregate values of the impact computed by a plurality of computing devices.

The rule management unit 405 may be configured to manage a set of rules. The rule management unit 405 may, for example, track different versions of a rule, different rules associated with a stage in a translation process, rule(s)/ruleset associated with a metric (i.e., required for evaluating a metric) or associated with an analysis, or one or more metrics associated with a stage/rule, and various others. The rule management unit 405 may implement the storage mechanism or versioning techniques as described above. In some cases, the rule management unit may be configured to track the metrics and the versions of rules such that the rule change analysis unit 403 may be able to identify which of the one or more metrics need to be re-calculated upon receiving a given rule change or which examples need to be re-evaluated against. In some cases the rule management unit 405 may also be configured to manage other data stored in the storage system 420. For example, the examples used to evaluate a rule change may be updated and managed by the rule management unit 405.

The calculated impact of a rule change may be transmitted to the rule impact visualizer 401 for display. The calculated impact may be displayed to a user on a user interface 410. The rule impact visualizer 401 may be configured to provide instant or real-time impact result to a user. The impact of a rule change may be displayed in a dynamic and simple fashion. For example, a user may be allowed to view a quantitative measurement of a change of a rule as an overall score. The user may choose to view detailed information such as the value for each metric or metrics in different stages in a translation process such that the user may be better guided to further change the rule.

The storage unit 420 can be the same as the storage device as described above. For example, the storage unit may comprise databases. The storage unit 420 may be configured to store data including, but not limited to, set of rules, different versions of a rule, metrics for calculating an impact, values of the metrics, examples (e.g., corpora) for evaluating a metric, rule(s)/ruleset associated with a metric (i.e., required for evaluating a metric), data about users in the system and various others as described elsewhere herein.

The rule impact visualizer 401 may provide the impact of a rule for display on a user interface 410. The user interface 410 may comprise a graphical user interface. The user interface may allow a user to interact with the rule analysis engine 400. The user interface may be configured to receive user input and output information to a user. The user input may be related to editing a rule, adding a rule or deleting a rule, for example. The user interface may include a screen such as a touch screen and any other user interactive external device such as handheld controller, mouse, joystick, keyboard, trackball, touchpad, button, verbal commands, gesture-recognition, attitude sensor, thermal sensor, touch-capacitive sensors, or any other device. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

Figure 5:
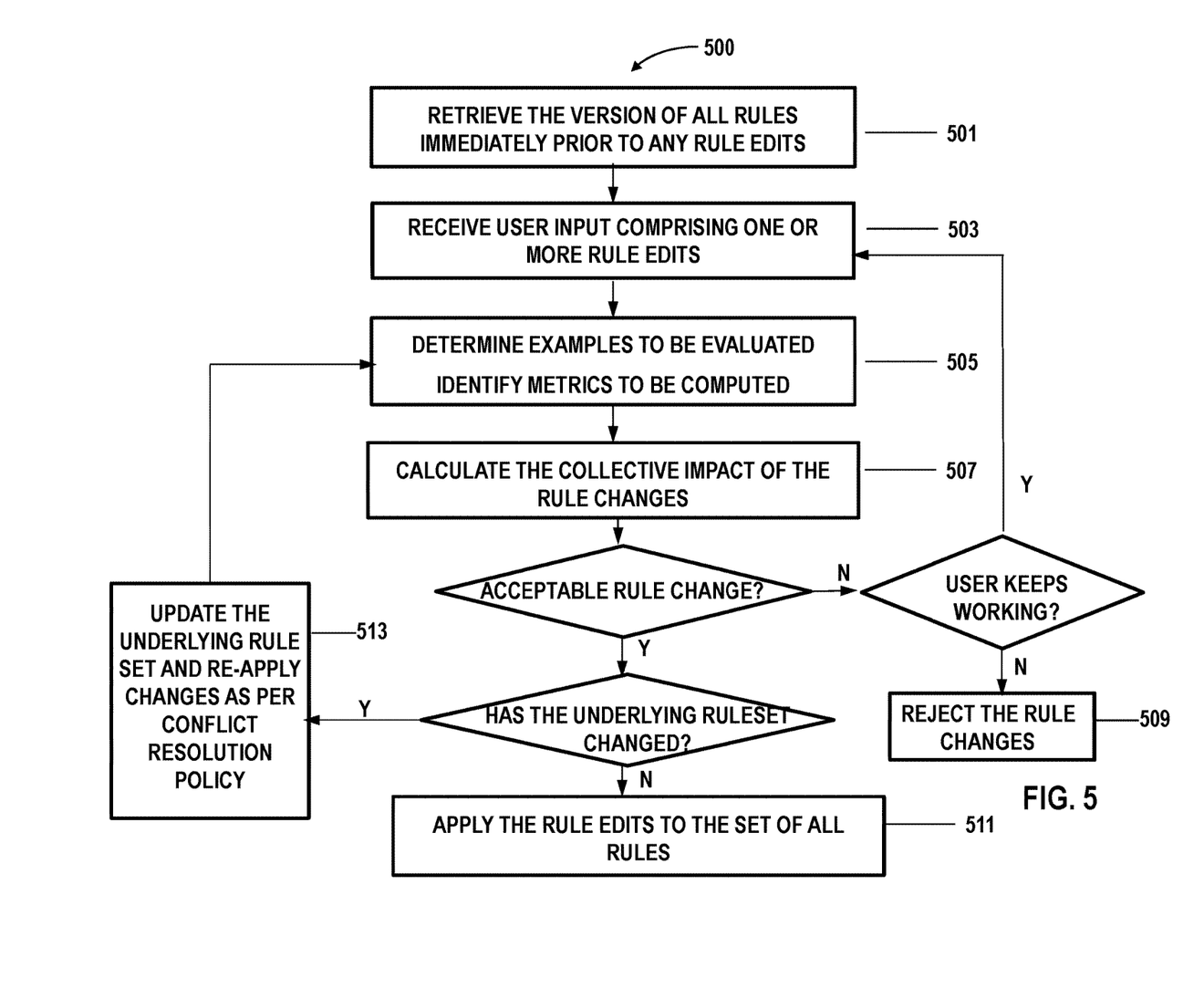
FIG. 5 shows an example of a process for making rule changes, in accordance with embodiments of the invention.

FIG. 5 shows an example of a process for modifying the set of rules. The process may begin with receiving one or more user inputs (operation 501). Each user input may comprise change of a rule, modification to a rule, definition of a rule and various others. Upon receiving the user input, the version of all relevant rules immediately prior to the rule edits may be retrieved (operation 503). In some cases, any given prior version of the rule may be retrieved. In some cases, a user may be permitted to define which prior versions (e.g., up to sometime point, or the number of versions, created by certain group of uses) should be retrieved. In some cases, along with the version information of the relevant rules, one or more stages in a translation process in which the rules have been applied may also be retrieved. Next, one or more metrics for calculating the impact of the associated rule change may be identified, and a collection of examples may be determined for evaluating the one or more metrics (operation 505). In some cases, some of the collection of examples that are not affected by the rule changes may not need to be evaluated thereby the computation consumption may be reduced. In some case, one or more metrics that are not associated with the stage in which the rules are applied may be identified, and values of the one or more metrics from prior calculation may be retrieved without re-calculation.

Next, the impact or impact level of the rule change is calculated (operation 507). As aforementioned, the impact of the rule change can be an aggregated result of impacts computed by multiple computing devices. The impact computed by each device can be partial of the overall impact result. In some cases, the impact computed by each computing device can be a portion of the metrics. In some cases, the impact computed by each computing device can be a value computed using a subset of the collection of examples. The aggregated result can be obtained using any suitable equations or formulas as described above (e.g., sum, weighted sum, etc).

In some cases, the quantitative measurement of the rule change may be compared against a threshold to decide whether the rule changes are acceptable. Various policies can be employed to determine if a rule change is acceptable. For example, the computed value of a rule change or the value of each metric may be compared against a threshold respectively to determine whether a rule can be accepted. For instance, when the number of examples can be lexed, parsed, translated, or translated correctly with different spacing exceeds a pre-determined threshold respectively, the corresponding rule changes may be considered to be acceptable. In another example, the overall impact value may be compared against a threshold to determine whether the rule change is acceptable.

In some cases, the underlying ruleset or set of examples may have changed in some way. For example, another user may have applied different edits to the set of rules. In another example, one or more of the examples may have been edited. In some cases, the underlying ruleset and set of examples may be updated as per a conflict resolution policy, and the set of rule edits re-applied to the updated underlying rule set (operation 513).

In some cases, the rule edits may be applied to the current set of rules or published/committed upon determining whether the rule edits are acceptable (operation 511). In some case, the rule edits may be declined or rejected upon determining the rule edits are not acceptable (operation 509). In this case, the user submitting the rule edits may choose to either continue making rule edits, or to discard their set of rule changes entirely.

Although FIG. 5 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, in some cases determining examples and metrics to be evaluated (operation 505) can be performed concurrently with retrieving a prior version of the rule set (operation 503). In another example, additional operations such as examining if rule edits is in conflict with any current rules may be performed prior to applying the rule edit to the current set of rules. The method may also be modified in accordance with other aspects of the disclosure as provided herein.

Multi-User Platform for Rule Construction

In some embodiments, methods and systems of the present disclosure may allow multiple users writing rules simultaneously. The provided machine translation system may utilize a mechanism for resolving conflicting rules/rule changes. The conflict resolution process may be invoked when multiple users create conflicting modifications of rules. The conflict resolution process may be performed automatically and in real-time without user intervention.

Figure 6:
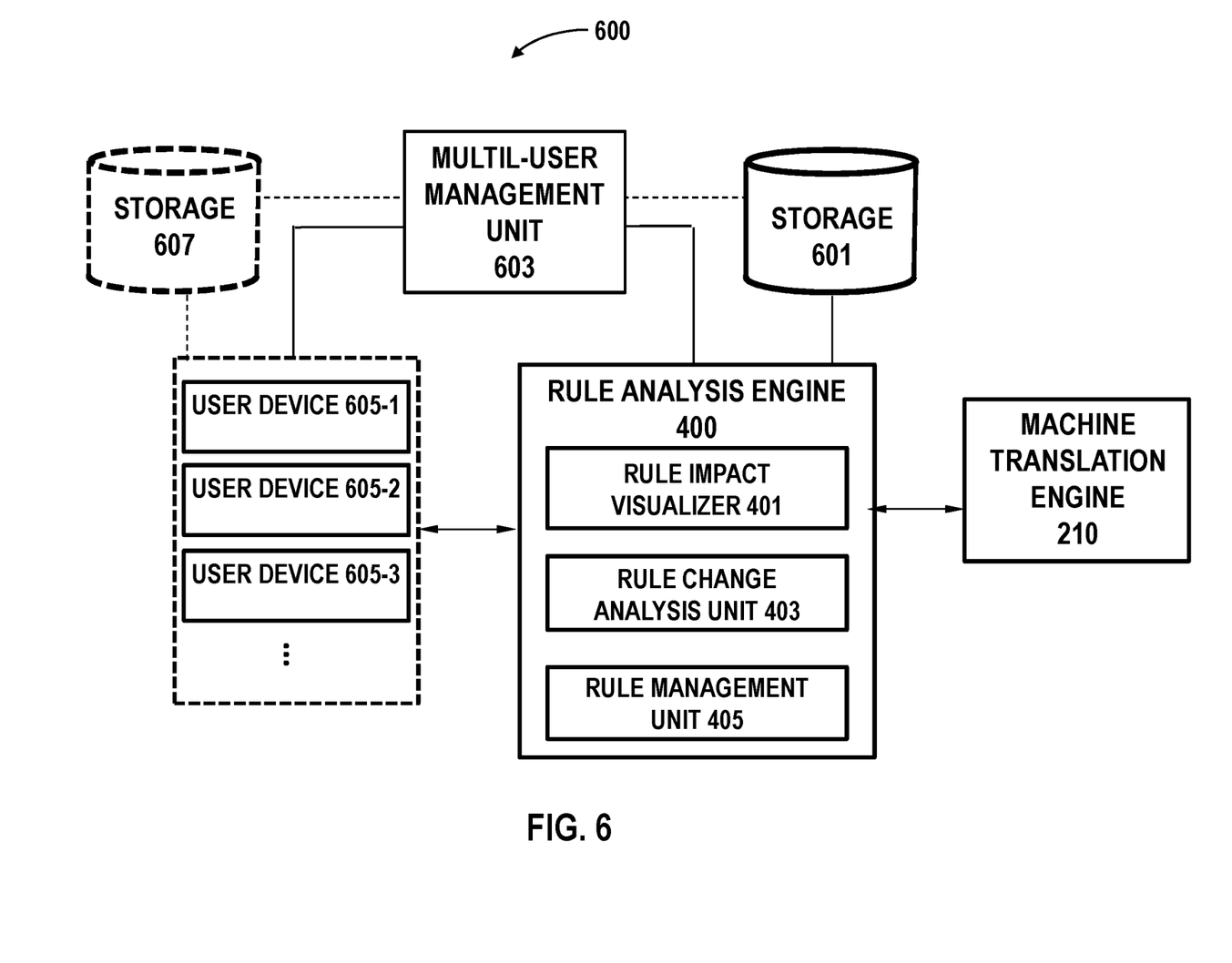
FIG. 6 schematically illustrates a machine translation system for multiple users.

FIG. 6 schematically illustrates a machine translation system 600 for multiple users. Details about the rule analysis engine and the machine translation engine have been described elsewhere herein. Multiple user devices 605-1, 605-2, 605-3 may each be configured for receiving user inputs. In some cases, at least some of the user inputs comprise conflicting rule changes or rule definitions.

The machine translation system 600 may comprise a multi-user management unit 603 for resolving the conflicting rules. In some cases, the multi-user management unit 603 may be configured to determine how the rules from the conflicting rules are applied to the system based on a conflicting resolution policy. Various conflicting resolution policies can be employed. For example, the conflicting resolution policy may be that the last submitted rule change is the rule change to be accepted. In another example, the conflicting policy may be that rules provided by a user with higher level of authority should be accepted. In some cases, the resolution policy can be at a finer grained level, such as merging overlapping edits for a single rule or across multiple rules in a rule change. In some cases, after resolving the conflict and a winning rule is determined, the rule analysis engine 400 may proceed with calculating the impact of the winning rule. Alternatively, the impact of each conflicting rule may be calculated by the rule analysis engine 400.

In some cases, the machine translation system 600 may include an optional storage unit 607 in communication with the multiple user devices. The storage unit 607 may be configured to store the conflicting rules submitted by the multiple user devices but are rejected by the multi-user management unit 603. The optional storage 607 can also be integrated with the storage 601 as a single component.

Figure 7:
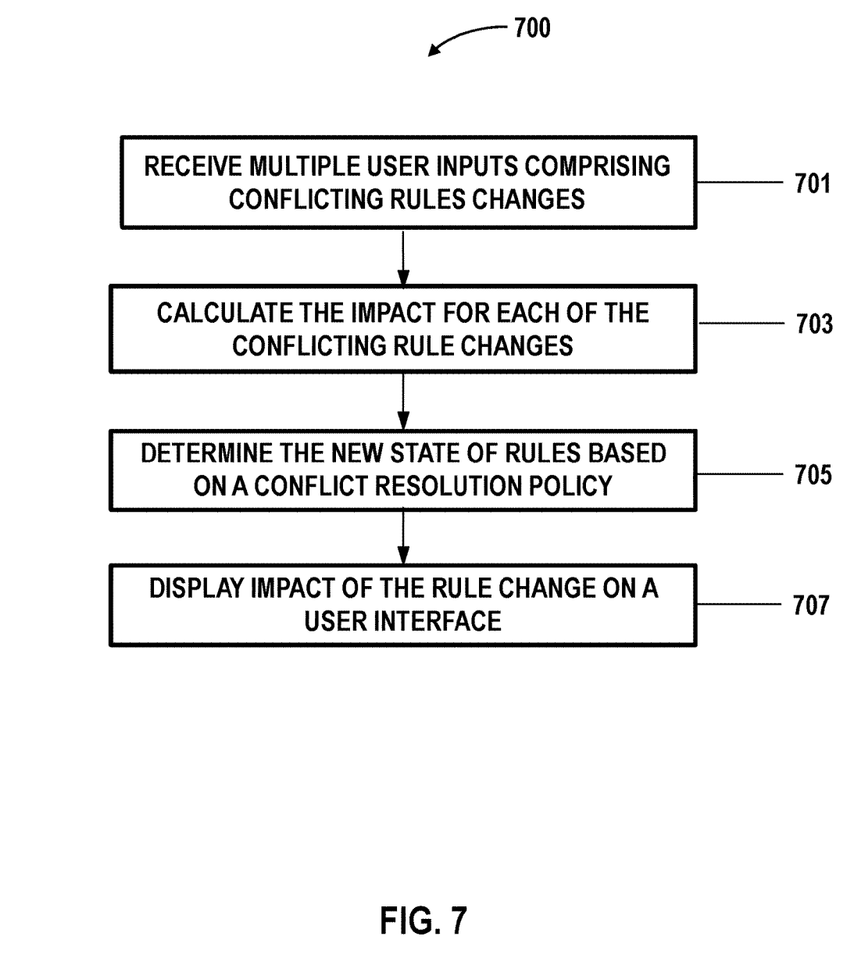
FIG. 7 shows an example of a process for adding rules by multiple users.

FIG. 7 shows an example of a process 700 for managing the concurrent editing of rules by multiple users. The process may begin with receiving multiple user inputs (operation 701). At least some of the user inputs comprise conflicting rules or rule changes. The impact for each of the conflicting rule change may be calculated (operation 703) to determine whether the rule changes are valid. Next, for each rule edit, the subsequent state of the rule may be determined from the conflicting rule edits and the underlying ruleset based on a conflicting resolution policy (operation 705).

Finally, the impact of the winning rule or rule change may be displayed to the user on a user interface (operation 707).

Although FIG. 7 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, a winning rule edit may be determined from a plurality of conflicting rule edits prior to calculating the impact for each rule edit. The method may also be modified in accordance with other aspects of the disclosure as provided herein. For instance, any operations or methods described with respect to calculating an impact of a rule change can be applied to operation 703.

Computer System

Figure 8:
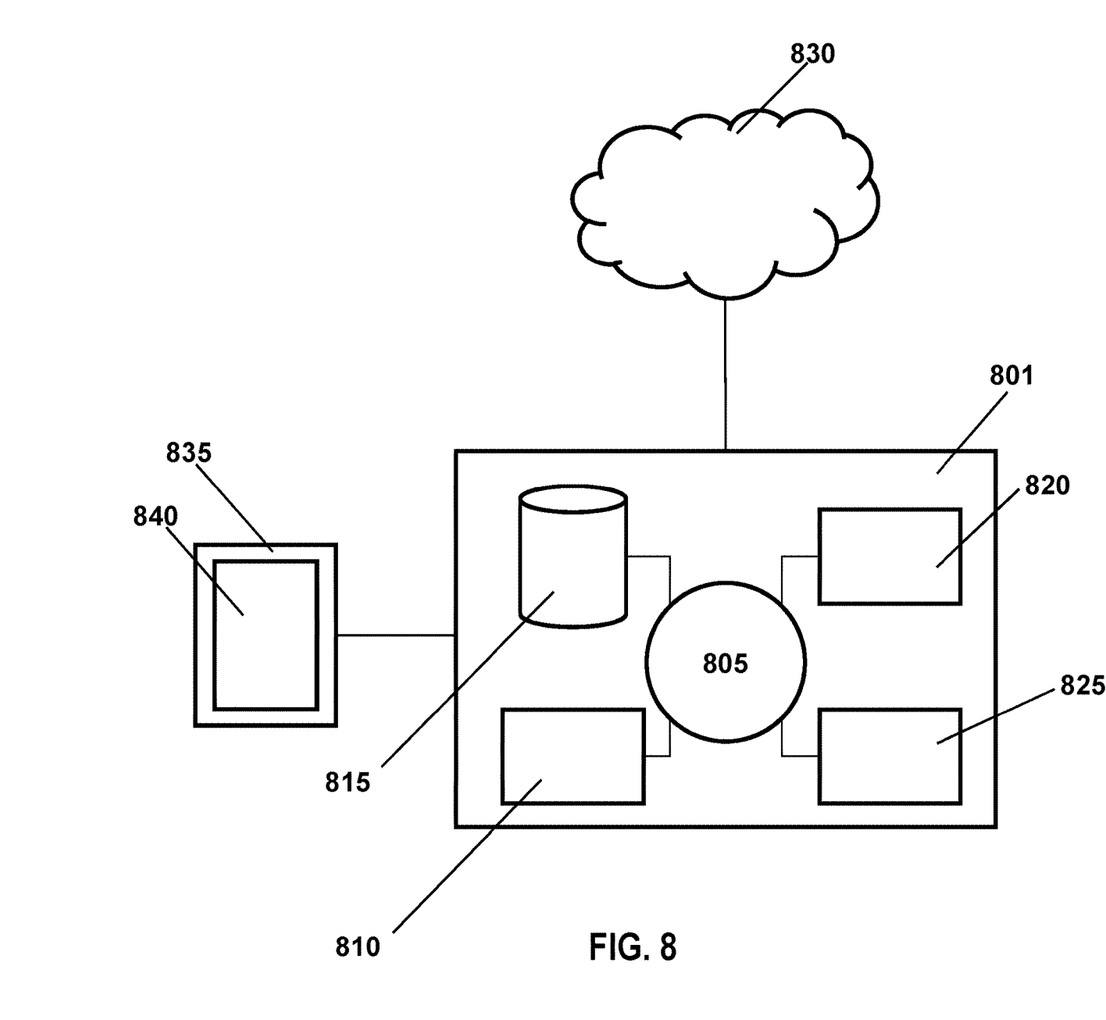
FIG. 8 shows a computer system that can be configured to implement any computing system disclosed in the present application.

The rule analysis engine, machine translation system or the machine translation system can be implemented by one or more processors. In some embodiments, the processor may be a processing unit of a computer system. FIG. 8 shows a computer system 801 that can be configured to implement any computing system disclosed in the present application. The computer system 801 can comprise a mobile phone, a tablet, a wearable device, a laptop computer, a desktop computer, a central server, etc.

The computer system 801 includes a central processing unit (CPU, also "processor" and "computer processor" herein) 805, which can be a single core or multi core processor, or a plurality of processors for parallel processing. The CPU can be the processor as described above. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. In some cases, the communication interface may allow the computer to be in communication with another device such as the imaging device or audio device. The computer may be able to receive input data from the coupled devices for analysis. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

Methods and systems of the present disclosure can be implemented by way of one or more algorithms. An algorithm can be implemented by way of software upon execution by the central processing unit 805. The algorithm can, for example, partition a computer model of a part according to a hierarchy, receive user inputted data for modifying one or more parameters and produce a machine code.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The memory 810 can be a volatile or non-volatile, magnetic, semiconductor, tape, optical, removable, non-removable, or other type of storage device or tangible and/or non-transitory computer-readable medium that stores programs, such as the interactive slicer and operating system. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

The memory 810 may store instructions that enable processor to execute one or more applications, such as the interactive slicer and operating system, and any other type of application or software available or executable on computer systems. Alternatively or additionally, the instructions, application programs, etc. can be stored in an internal and/or external database (e.g., a cloud storage system—not shown) that is in direct communication with computing device, such as one or more databases or memories accessible via one or more networks (not shown). The memory 810 can include one or more memory devices that store data and instructions usable to perform one or more features provided herein. The memory 810 can also include any combination of one or more databases controlled by memory controller devices (e.g., servers, etc.) or software, such as document management systems, Microsoft SQL databases, SharePoint databases, Oracle™ databases, Sybase™ databases, or other relational databases. Data used in the slicing process such as hierarchies, rules for portioning a model corresponding to each hierarchy, valid range for some or all of the parameters, printer configurations, printer specifications, and the like may be stored in the one or more databases.

The computer system 801 may be communicatively connected to one or more remote memory devices (e.g., remote databases—not shown) through a network. The remote memory devices can be configured to store information that computer system 801 can access and/or manage. By way of example, the remote memory devices may be document management systems, Microsoft SQL database, SharePoint databases, Oracle™ databases, Sybase™ databases, Cassandra, HBase, or other relational or non-relational databases or regular files. Systems and methods provided herein, however, are not limited to separate databases or even to the use of a database.

The computer system 801 can communicate with one or more remote computer systems through the network 830. For instance, the computer system 801 can communicate with a remote computer system of a user. Examples of remote computer systems include personal computers, slate or tablet PC's, smart phones, personal digital assistants, and so on. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface 840 for providing, for example, a scanning interface or a footwear purchase interface. Examples of UI's include, without limitation, a graphical user interface (GUI) and web-based user interface. The user interface 840 may be the same as the user interface as described in FIG. 4. Alternatively, the user interface may be a separate user interface.

Methods and systems of the present disclosure can be implemented by way of one or more algorithms. An algorithm can be implemented by way of software upon execution by the central processing unit 805.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A method for iteratively building a ruleset for machine translation, comprising:
   (a) receiving user input indicating one or more edits of a rule;
   (b) retrieving a prior version of the rule from a storage unit upon receiving the user input;
   (c) identifying one or more metrics from a plurality of metrics based at least in part on the prior version of the rule and the one or more edits;
   (d) computing, with aid of one or more processors, a value for each of the one or more metrics by evaluating each metric against a set of examples by applying the rule with the one or more edits and one or more other rules from the ruleset, wherein the value represents the impact level of the one or more edits of the rule;
   (e) comparing the value to a pre-determined threshold to determine whether the one or more edits are acceptable;
   (f) detecting one or more conflicting edits made to the ruleset that are conflicting with the one or more edits when the one or more edits are determined to be acceptable, and updating the ruleset with a winning edits, wherein the winning edits are determined based on a conflict resolution policy; and
   (g) displaying the one or more metrics and the associated values on a graphical user interface (GUI).

2. The method of claim 1, further comprising repeating (a)-(d) when the one or more edits are determined to be not acceptable in (d).

3. The method of claim 1, wherein the one or more metrics are selected from a group consisting of a number of examples from the set of examples that are lexed, a number of examples from the set of examples that are parsed, and a number of examples from the set of examples that are correctly translated.

4. The method of claim 1, further comprising transmitting the ruleset with the winning edits to a machine translation engine for implementation.

5. The method of claim 1, wherein the value for each of the one or more metrics is evaluated against different sets of examples by multiple computing devices.

6. The method of claim 5, wherein an aggregation of the values computed by the multiple computing devices is used for representing the impact level of the one or more edits of the rule.

7. The method of claim 1, wherein at least one metric from the plurality of metrics is identified to be not affected by the one or more edits of the rule.

* * * * *